US010462025B2

(12) United States Patent
Baumback et al.

(10) Patent No.: US 10,462,025 B2
(45) Date of Patent: *Oct. 29, 2019

(54) MONITORING PERFORMANCE AND OPERATION OF DATA EXCHANGES

(71) Applicant: Amazon Technologies, Inc., Reno, NV (US)

(72) Inventors: Mark S. Baumback, Seattle, WA (US); David William Bettis, Seattle, WA (US); Jonathan A. Jenkins, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/942,556

(22) Filed: Jul. 15, 2013

(65) Prior Publication Data

US 2013/0311604 A1    Nov. 21, 2013

Related U.S. Application Data

(63) Continuation of application No. 13/372,708, filed on Feb. 14, 2012, now Pat. No. 8,489,737, which is a (Continued)

(51) Int. Cl.
*H04L 12/26* (2006.01)
*H04L 29/08* (2006.01)
*G06F 16/957* (2019.01)

(52) U.S. Cl.
CPC ........... *H04L 43/08* (2013.01); *H04L 67/22* (2013.01); *G06F 16/957* (2019.01);
(Continued)

(58) Field of Classification Search
CPC ....... H04L 43/08; H04L 67/22; H04L 67/025; H04L 67/2847; H04L 67/327;
(Continued)

(56) References Cited

U.S. PATENT DOCUMENTS 5,649,185 A    7/1997 Antognini et al.
5,664,106 A    9/1997 Caccavale
(Continued)

FOREIGN PATENT DOCUMENTS

CN      101189598 A      5/2008
WO      WO 2007/007960 A1   1/2007
WO      WO 2012/044587 A1   4/2012

OTHER PUBLICATIONS

Bennami, M., et al., Resource Allocation for Autonomic Data Centers Using Analytic Performance Models, 2005, IEEE, 12 pages.
(Continued)

*Primary Examiner* — Jungwon Chang
(74) *Attorney, Agent, or Firm* — Knobbe, Martens, Olson & Bear, LLP

(57) ABSTRACT

A system and method for monitoring the performance associated with fulfilling resource requests are provided. One or more client computing devices obtain an original resource request and associate a record identifier with the original resource request. The one or more client computing devices also determine performance data associated with processing each embedded resource request included in a response to the original resource request. Each embedded resource request is associated with a component record identifier that is associated with, but different from, the record identifier of the original resource request. The one or more client computing devices can then transmit the determined performance data with the record identifier to another processing device.

19 Claims, 7 Drawing Sheets

Related U.S. Application Data continuation of application No. 12/240,583, filed on Sep. 29, 2008, now Pat. No. 8,122,124.

(52) U.S. Cl.
CPC ........ *H04L 67/101* (2013.01); *H04L 67/1008* (2013.01); *H04L 67/1012* (2013.01); *H04L 67/1023* (2013.01); *H04L 67/327* (2013.01)

(58) Field of Classification Search
CPC ....... H04L 67/24; H04L 47/70; H04L 47/823; H04L 43/16; H04L 43/04; H04L 41/0896; H04L 41/5009; H04L 67/1008; H04L 67/1023; H04L 67/1012; H04L 67/101; G06F 11/3419; G06F 17/30902; G06F 17/30896; G06F 16/957
USPC ....... 709/224, 203, 239, 217, 219, 238, 201; 713/201

See application file for complete search history.

(56) References Cited

U.S. PATENT DOCUMENTS

| | | | |
|---|---|---|---|
| 5,819,033 A | 10/1998 | Caccavale | |
| 5,832,517 A | 11/1998 | Knutsen, II | |
| 5,999,636 A | 12/1999 | Juang | |
| 6,173,322 B1 | 1/2001 | Hu | |
| 6,182,125 B1 | 1/2001 | Borella et al. | |
| 6,185,598 B1 | 2/2001 | Farber et al. | |
| 6,192,051 B1 | 2/2001 | Lipman et al. | |
| 6,243,761 B1 | 6/2001 | Mogul et al. | |
| 6,377,257 B1 | 4/2002 | Borrel et al. | |
| 6,438,592 B1 | 8/2002 | Killian | |
| 6,473,804 B1 | 10/2002 | Kaiser et al. | |
| 6,529,910 B1 | 3/2003 | Fleskes | |
| 6,553,419 B1 | 4/2003 | Ram | |
| 6,560,610 B1 | 5/2003 | Eatherton et al. | |
| 6,611,873 B1 | 8/2003 | Kanehara | |
| 6,633,324 B2 | 10/2003 | Stephens, Jr. | |
| 6,662,233 B1 | 12/2003 | Skarpness et al. | |
| 6,697,805 B1 | 2/2004 | Choquier et al. | |
| 6,698,013 B1 | 2/2004 | Bertero et al. | |
| 6,714,975 B1 | 3/2004 | Aggarwal et al. | |
| 6,820,133 B1 | 11/2004 | Grove et al. | |
| 6,920,498 B1 | 7/2005 | Gourley et al. | |
| 6,978,418 B1 | 12/2005 | Bain et al. | |
| 7,009,943 B2 | 3/2006 | O'Neil | |
| 7,023,465 B2 | 4/2006 | Stephens, Jr. | |
| 7,065,496 B2 | 6/2006 | Subbloie et al. | |
| 7,085,825 B1 | 8/2006 | Pishevar et al. | |
| 7,096,193 B1 | 8/2006 | Beaudoin et al. | |
| 7,107,273 B2 | 9/2006 | Ohata et al. | |
| 7,114,160 B2 | 9/2006 | Suryanarayana et al. | |
| 7,120,871 B1 | 10/2006 | Harrington | |
| 7,120,874 B2 | 10/2006 | Shah et al. | |
| 7,146,560 B2 | 12/2006 | Dang et al. | |
| 7,185,084 B2 | 2/2007 | Sirivara et al. | |
| 7,269,657 B1 | 9/2007 | Alexander et al. | |
| 7,316,648 B2 | 1/2008 | Kelly et al. | |
| 7,320,131 B1 | 1/2008 | O'Toole, Jr. | |
| 7,343,399 B2 | 3/2008 | Hayball et al. | |
| 7,346,676 B1 | 3/2008 | Swildens et al. | |
| 7,373,599 B2 | 5/2008 | McElfresh et al. | |
| 7,502,836 B2 | 3/2009 | Menditto et al. | |
| 7,523,181 B2 | 4/2009 | Swildens et al. | |
| 7,555,542 B1 | 6/2009 | Ayers et al. | |
| 7,581,224 B2 | 8/2009 | Romero | |
| 7,596,150 B2 | 9/2009 | Baird et al. | |
| 7,623,460 B2 | 11/2009 | Miyazaki | |
| 7,624,169 B2 | 11/2009 | Lisiecki et al. | |
| 7,650,376 B1 | 1/2010 | Blumenau | |
| 7,653,725 B2 | 1/2010 | Yahiro et al. | |
| 7,676,570 B2 | 3/2010 | Levy et al. | |
| 7,685,270 B1 | 3/2010 | Vermeulen et al. | |
| 7,685,273 B1 | 3/2010 | Anastas et al. | |
| 7,698,418 B2 | 4/2010 | Shimada et al. | |
| 7,707,071 B2 | 4/2010 | Rigole | |
| 7,707,173 B2 | 4/2010 | Nanavati et al. | |
| 7,725,658 B2 | 5/2010 | Lang et al. | |
| 7,739,400 B2 | 6/2010 | Lindbo et al. | |
| 7,748,005 B2 | 6/2010 | Romero et al. | |
| 7,752,301 B1 | 7/2010 | Maiocco et al. | |
| 7,756,032 B2 | 7/2010 | Feick et al. | |
| 7,765,295 B2 | 7/2010 | Anastas et al. | |
| 7,773,596 B1 | 8/2010 | Marques | |
| 7,787,380 B1 | 8/2010 | Aggarwal et al. | |
| 7,860,735 B2 | 12/2010 | Evanitsky | |
| 7,865,594 B1 | 1/2011 | Baumback et al. | |
| 7,873,065 B1 | 1/2011 | Mukerji et al. | |
| 7,904,875 B2 | 3/2011 | Hegyi | |
| 7,925,782 B2 | 4/2011 | Sivasubramanian et al. | |
| 7,930,393 B1 | 4/2011 | Baumback et al. | |
| 7,933,988 B2 | 4/2011 | Nasuto et al. | |
| 7,937,456 B2 | 5/2011 | McGrath | |
| 7,937,477 B1 | 5/2011 | Day et al. | |
| 7,949,779 B2 | 5/2011 | Farber et al. | |
| 7,961,736 B2 | 6/2011 | Ayyagari | |
| 7,962,597 B2 | 6/2011 | Richardson et al. | |
| 7,979,509 B1 | 7/2011 | Malmskog et al. | |
| 8,028,090 B2 | 9/2011 | Richardson et al. | |
| 8,051,166 B1 | 11/2011 | Baumback et al. | |
| 8,069,231 B2 | 11/2011 | Schran et al. | |
| 8,082,348 B1 | 12/2011 | Averbuj et al. | |
| 8,117,306 B1 | 2/2012 | Baumback et al. | |
| 8,122,124 B1 * | 2/2012 | Baumback et al. | 709/224 |
| 8,165,915 B1 | 4/2012 | Lucash | |
| 8,286,176 B1 | 10/2012 | Baumback et al. | |
| 8,296,429 B2 | 10/2012 | Baumback et al. | |
| 8,316,124 B1 * | 11/2012 | Baumback et al. | 709/224 |
| 8,321,568 B2 | 11/2012 | Sivasubramanian et al. | |
| 8,452,870 B2 | 5/2013 | Baumback et al. | |
| 8,463,877 B1 | 6/2013 | Richardson | |
| 8,468,245 B2 | 6/2013 | Farber et al. | |
| 8,489,737 B2 * | 7/2013 | Baumback et al. | 709/224 |
| 8,667,127 B2 | 3/2014 | Bettis et al. | |
| 8,762,526 B2 | 6/2014 | Baumback et al. | |
| 8,843,625 B2 | 9/2014 | Baumback et al. | |
| 9,071,502 B2 | 6/2015 | Baumback et al. | |
| 9,088,460 B2 | 7/2015 | Baumback et al. | |
| 9,118,543 B2 | 8/2015 | Baumback et al. | |
| 9,160,641 B2 | 10/2015 | Baumback et al. | |
| 9,210,099 B2 | 12/2015 | Baumback et al. | |
| 9,367,929 B2 | 6/2016 | Bettis et al. | |
| 9,491,073 B2 | 11/2016 | Baumback et al. | |
| 9,628,403 B2 | 4/2017 | Baumback et al. | |
| 9,660,890 B2 | 5/2017 | Baumback et al. | |
| 9,769,248 B1 | 9/2017 | Krishnan et al. | |
| 9,794,188 B2 | 10/2017 | Baumback et al. | |
| 9,825,831 B2 | 11/2017 | Baumback et al. | |
| 10,027,739 B1 | 7/2018 | Krishnan et al. | |
| 10,104,009 B2 | 10/2018 | Baumback et al. | |
| 2001/0034771 A1 | 10/2001 | Hutsch et al. | |
| 2002/0016802 A1 | 2/2002 | Hodgkinson | |
| 2002/0062372 A1 | 5/2002 | Hong et al. | |
| 2002/0069420 A1 | 6/2002 | Russell et al. | |
| 2002/0073235 A1 | 6/2002 | Chen et al. | |
| 2002/0083118 A1 | 6/2002 | Sim | |
| 2002/0099829 A1 | 7/2002 | Richards et al. | |
| 2002/0099850 A1 | 7/2002 | Farber et al. | |
| 2002/0107913 A1 | 8/2002 | Rivera et al. | |
| 2002/0107944 A1 | 8/2002 | Bai et al. | |
| 2002/0112049 A1 | 8/2002 | Elnozahy et al. | |
| 2002/0116481 A1 | 8/2002 | Lee | |
| 2002/0116491 A1 * | 8/2002 | Boyd | G06F 11/3419 709/224 |
| 2002/0120666 A1 | 8/2002 | Landsman et al. | |
| 2002/0124098 A1 | 9/2002 | Shaw | |
| 2002/0135611 A1 | 9/2002 | Deosaran et al. | |
| 2002/0138437 A1 | 9/2002 | Lewin et al. | |
| 2002/0138443 A1 | 9/2002 | Schran et al. | |
| 2002/0143989 A1 | 10/2002 | Huitema et al. | |
| 2002/0150094 A1 | 10/2002 | Cheng et al. | |
| 2002/0150276 A1 | 10/2002 | Chang | |

(56) References Cited

U.S. PATENT DOCUMENTS

| | | |
|---|---|---|
| 2002/0156884 A1 | 10/2002 | Bertram et al. |
| 2002/0161767 A1 | 10/2002 | Shapiro et al. |
| 2002/0161911 A1 | 10/2002 | Pinckney, III et al. |
| 2002/0163882 A1 | 11/2002 | Bornstein et al. |
| 2002/0165912 A1 | 11/2002 | Wenocur et al. |
| 2002/0194382 A1 | 12/2002 | Kausik et al. |
| 2002/0198963 A1 | 12/2002 | Wu et al. |
| 2003/0005111 A1 | 1/2003 | Allan |
| 2003/0009488 A1 | 1/2003 | Hart, III |
| 2003/0033283 A1 | 2/2003 | Evans et al. |
| 2003/0037108 A1* | 2/2003 | Peiffer et al. ............... 709/203 |
| 2003/0065784 A1 | 4/2003 | Herrod |
| 2003/0118249 A1 | 6/2003 | Edgar |
| 2003/0120741 A1 | 6/2003 | Wu et al. |
| 2003/0128233 A1 | 7/2003 | Kasriel |
| 2003/0130982 A1 | 7/2003 | Kasriel |
| 2003/0131106 A1 | 7/2003 | Kasriel |
| 2003/0149581 A1 | 8/2003 | Chaudhri et al. |
| 2003/0172291 A1 | 9/2003 | Judge et al. |
| 2003/0174648 A1 | 9/2003 | Wang et al. |
| 2003/0182305 A1 | 9/2003 | Balva et al. |
| 2003/0182413 A1 | 9/2003 | Allen et al. |
| 2003/0200394 A1 | 10/2003 | Ashmore et al. |
| 2003/0204602 A1 | 10/2003 | Hudson et al. |
| 2003/0217144 A1* | 11/2003 | Fu ........................ H04L 29/06 |
| | | 709/224 |
| 2003/0221000 A1* | 11/2003 | Cherkasova ........... H04L 67/24 |
| | | 709/224 |
| 2003/0229682 A1 | 12/2003 | Day |
| 2003/0233423 A1 | 12/2003 | Dilley et al. |
| 2003/0236836 A1 | 12/2003 | Borthwick |
| 2004/0010621 A1 | 1/2004 | Afergan et al. |
| 2004/0039794 A1 | 2/2004 | Biby et al. |
| 2004/0039820 A1 | 2/2004 | Colby et al. |
| 2004/0049541 A1 | 3/2004 | Swahn |
| 2004/0049579 A1 | 3/2004 | Ims et al. |
| 2004/0059796 A1 | 3/2004 | McLintock |
| 2004/0064293 A1 | 4/2004 | Hamilton et al. |
| 2004/0064558 A1 | 4/2004 | Miyake |
| 2004/0073596 A1 | 4/2004 | Kloninger et al. |
| 2004/0083307 A1 | 4/2004 | Uysal |
| 2004/0128538 A1* | 7/2004 | Gmuender et al. ........... 713/201 |
| 2004/0167981 A1 | 8/2004 | Douglas et al. |
| 2004/0194085 A1 | 9/2004 | Beaubien et al. |
| 2004/0199603 A1 | 10/2004 | Tafla et al. |
| 2004/0205162 A1 | 10/2004 | Parikh |
| 2004/0221034 A1 | 11/2004 | Kausik et al. |
| 2005/0021706 A1 | 1/2005 | Maggi et al. |
| 2005/0021862 A1 | 1/2005 | Schroeder et al. |
| 2005/0038967 A1 | 2/2005 | Umbehocker et al. |
| 2005/0055420 A1 | 3/2005 | Wyler |
| 2005/0076111 A1* | 4/2005 | Cherkasova ........... G06Q 30/00 |
| | | 709/224 |
| 2005/0076339 A1 | 4/2005 | Merril et al. |
| 2005/0086645 A1 | 4/2005 | Diao et al. |
| 2005/0091612 A1 | 4/2005 | Stabb et al. |
| 2005/0102683 A1 | 5/2005 | Branson et al. |
| 2005/0108529 A1 | 5/2005 | Juneau |
| 2005/0114296 A1 | 5/2005 | Farber et al. |
| 2005/0157712 A1 | 7/2005 | Rangarajan et al. |
| 2005/0163168 A1 | 7/2005 | Sheth et al. |
| 2005/0171959 A1 | 8/2005 | Deforche et al. |
| 2005/0182826 A1* | 8/2005 | Knittel ............... H04L 67/2847 |
| | | 709/219 |
| 2005/0198571 A1 | 9/2005 | Kramer et al. |
| 2005/0216569 A1 | 9/2005 | Coppola et al. |
| 2005/0223091 A1 | 10/2005 | Zahavi et al. |
| 2005/0223092 A1 | 10/2005 | Sapiro et al. |
| 2005/0229119 A1 | 10/2005 | Torvinen |
| 2005/0259672 A1 | 11/2005 | Eduri |
| 2005/0273507 A1 | 12/2005 | Yan et al. |
| 2006/0015865 A1 | 1/2006 | Schneider et al. |
| 2006/0020684 A1 | 1/2006 | Mukherjee et al. |
| 2006/0020714 A1 | 1/2006 | Girouard et al. |
| 2006/0026275 A1 | 2/2006 | Gilmour et al. |
| 2006/0036720 A1 | 2/2006 | Faulk, Jr. |
| 2006/0041614 A1 | 2/2006 | Oe |
| 2006/0047787 A1 | 3/2006 | Agarwal et al. |
| 2006/0059246 A1 | 3/2006 | Grove |
| 2006/0063534 A1 | 3/2006 | Kokkonen et al. |
| 2006/0069808 A1 | 3/2006 | Mitchell et al. |
| 2006/0075084 A1 | 4/2006 | Lyon |
| 2006/0085536 A1 | 4/2006 | Meyer et al. |
| 2006/0112176 A1 | 5/2006 | Liu et al. |
| 2006/0120385 A1 | 6/2006 | Atchison et al. |
| 2006/0179080 A1 | 8/2006 | Meek et al. |
| 2006/0195866 A1 | 8/2006 | Thukral |
| 2006/0209701 A1 | 9/2006 | Zhang et al. |
| 2006/0218304 A1 | 9/2006 | Mukherjee et al. |
| 2006/0227740 A1 | 10/2006 | McLaughlin et al. |
| 2006/0235961 A1* | 10/2006 | Klein ................... H04L 67/025 |
| | | 709/224 |
| 2006/0251339 A1 | 11/2006 | Gokturk et al. |
| 2006/0259690 A1 | 11/2006 | Vittal et al. |
| 2006/0259984 A1 | 11/2006 | Juneau |
| 2006/0265497 A1 | 11/2006 | Ohata et al. |
| 2006/0282758 A1 | 12/2006 | Simons et al. |
| 2007/0011267 A1 | 1/2007 | Overton et al. |
| 2007/0016736 A1 | 1/2007 | Takeda et al. |
| 2007/0021998 A1 | 1/2007 | Laithwaite et al. |
| 2007/0038994 A1 | 2/2007 | Davis et al. |
| 2007/0050703 A1 | 3/2007 | Lebel |
| 2007/0055764 A1 | 3/2007 | Dilley et al. |
| 2007/0076872 A1 | 4/2007 | Juneau |
| 2007/0086429 A1 | 4/2007 | Lawrence et al. |
| 2007/0088805 A1 | 4/2007 | Cyster |
| 2007/0094325 A1 | 4/2007 | Ih et al. |
| 2007/0118640 A1 | 5/2007 | Subramanian et al. |
| 2007/0136469 A1 | 6/2007 | Nusbickel |
| 2007/0143672 A1 | 6/2007 | Lipton et al. |
| 2007/0168517 A1 | 7/2007 | Weller |
| 2007/0174442 A1 | 7/2007 | Sherman et al. |
| 2007/0174490 A1 | 7/2007 | Choi et al. |
| 2007/0198982 A1 | 8/2007 | Bolan et al. |
| 2007/0214454 A1 | 9/2007 | Edwards et al. |
| 2007/0219795 A1 | 9/2007 | Park et al. |
| 2007/0220010 A1 | 9/2007 | Ertugrul |
| 2007/0226058 A1 | 9/2007 | Lorenzen et al. |
| 2007/0239610 A1 | 10/2007 | Lemelson |
| 2007/0245010 A1 | 10/2007 | Arn et al. |
| 2007/0245299 A1 | 10/2007 | Sung et al. |
| 2007/0250560 A1 | 10/2007 | Wein et al. |
| 2007/0250611 A1 | 10/2007 | Bhogal et al. |
| 2007/0253377 A1 | 11/2007 | Janneteau et al. |
| 2007/0266151 A1 | 11/2007 | Friedland et al. |
| 2007/0271375 A1* | 11/2007 | Hwang ............... G06F 11/3419 |
| | | 709/224 |
| 2007/0271385 A1 | 11/2007 | Davis et al. |
| 2007/0280229 A1 | 12/2007 | Kenney |
| 2007/0288588 A1 | 12/2007 | Wein et al. |
| 2007/0299869 A1 | 12/2007 | Clary et al. |
| 2007/0299965 A1 | 12/2007 | Nieh et al. |
| 2007/0300152 A1 | 12/2007 | Baugher |
| 2008/0025304 A1 | 1/2008 | Venkataswami et al. |
| 2008/0037432 A1 | 2/2008 | Cohen et al. |
| 2008/0050021 A1 | 2/2008 | Plant |
| 2008/0065724 A1 | 3/2008 | Seed et al. |
| 2008/0065745 A1 | 3/2008 | Leighton et al. |
| 2008/0071859 A1 | 3/2008 | Seed et al. |
| 2008/0082551 A1 | 4/2008 | Farber et al. |
| 2008/0086559 A1 | 4/2008 | Davis et al. |
| 2008/0098310 A1 | 4/2008 | Choi |
| 2008/0104268 A1 | 5/2008 | Farber et al. |
| 2008/0104502 A1 | 5/2008 | Olston |
| 2008/0114875 A1* | 5/2008 | Anastas ........... G06F 17/30896 |
| | | 709/224 |
| 2008/0172488 A1 | 7/2008 | Jawahar et al. |
| 2008/0183672 A1 | 7/2008 | Canon et al. |
| 2008/0183721 A1 | 7/2008 | Bhogal et al. |
| 2008/0208961 A1* | 8/2008 | Kim ................... G06F 17/30902 |
| | | 709/203 |
| 2008/0215583 A1 | 9/2008 | Gunawardena et al. |
| 2008/0215718 A1 | 9/2008 | Stolorz et al. |
| 2008/0215735 A1 | 9/2008 | Farber et al. |

(56) References Cited

U.S. PATENT DOCUMENTS

| | | |
|---|---|---|
| 2008/0215750 A1 | 9/2008 | Farber et al. |
| 2008/0215755 A1 | 9/2008 | Farber et al. |
| 2008/0222281 A1 | 9/2008 | Dilley et al. |
| 2008/0222291 A1 | 9/2008 | Weller et al. |
| 2008/0228574 A1 | 9/2008 | Stewart et al. |
| 2008/0250327 A1 | 10/2008 | Li et al. |
| 2008/0289029 A1 | 11/2008 | Kim et al. |
| 2009/0029644 A1 | 1/2009 | Sue et al. |
| 2009/0031367 A1 | 1/2009 | Sue |
| 2009/0031368 A1 | 1/2009 | Ling |
| 2009/0031376 A1 | 1/2009 | Riley et al. |
| 2009/0037517 A1 | 2/2009 | Frei |
| 2009/0055542 A1 | 2/2009 | Zhao et al. |
| 2009/0063690 A1 | 3/2009 | Verthein et al. |
| 2009/0083228 A1 | 3/2009 | Shatz et al. |
| 2009/0089448 A1 | 4/2009 | Sze et al. |
| 2009/0119388 A1 | 5/2009 | Kikuchi et al. |
| 2009/0122714 A1 | 5/2009 | Kato |
| 2009/0187575 A1 | 7/2009 | DaCosta |
| 2009/0248786 A1* | 10/2009 | Richardson ....... H04L 29/12066 709/201 |
| 2009/0248852 A1 | 10/2009 | Fuhrmann et al. |
| 2009/0248858 A1* | 10/2009 | Sivasubramanian et al. ............... 709/224 |
| 2009/0248893 A1* | 10/2009 | Richardson ........... H04L 67/327 709/239 |
| 2009/0319636 A1 | 12/2009 | Tokumi |
| 2009/0327460 A1 | 12/2009 | Yoo et al. |
| 2009/0327517 A1* | 12/2009 | Sivasubramanian ........................ H04L 29/12132 709/238 |
| 2009/0327914 A1 | 12/2009 | Adar et al. |
| 2010/0005403 A1 | 1/2010 | Rozmaryn et al. |
| 2010/0034470 A1 | 2/2010 | Valencia-Campo et al. |
| 2010/0070603 A1 | 3/2010 | Moss et al. |
| 2010/0150155 A1 | 6/2010 | Napierala |
| 2010/0195908 A1 | 8/2010 | Bechtel et al. |
| 2010/0211459 A1 | 8/2010 | Seeman et al. |
| 2010/0318508 A1 | 12/2010 | Brawer et al. |
| 2010/0325615 A1 | 12/2010 | Ramot |
| 2010/0332650 A1 | 12/2010 | Aisen et al. |
| 2011/0040893 A1 | 2/2011 | Karaoguz et al. |
| 2011/0055627 A1 | 3/2011 | Zawacki et al. |
| 2011/0096987 A1 | 4/2011 | Morales et al. |
| 2011/0145715 A1 | 6/2011 | Malloy et al. |
| 2011/0252142 A1 | 10/2011 | Richardson et al. |
| 2011/0252143 A1 | 10/2011 | Baumback et al. |
| 2011/0264511 A1 | 10/2011 | Zhang |
| 2012/0042277 A1 | 2/2012 | Lin-Hendel |
| 2012/0164621 A1 | 6/2012 | Katz et al. |
| 2013/0007273 A1 | 1/2013 | Baumback et al. |
| 2013/0031040 A1 | 1/2013 | Modha |
| 2013/0191450 A1 | 7/2013 | Bodenhamer et al. |
| 2013/0198298 A1 | 8/2013 | Li et al. |
| 2014/0113600 A1 | 4/2014 | El Gamal et al. |
| 2014/0129707 A1 | 5/2014 | Baumback et al. |
| 2014/0135105 A1 | 5/2014 | Quan et al. |
| 2014/0143320 A1 | 5/2014 | Sivasubramanian et al. |
| 2014/0219279 A1 | 8/2014 | Gross et al. |
| 2014/0250051 A1 | 9/2014 | Lahav et al. |
| 2014/0257891 A1 | 9/2014 | Richardson et al. |
| 2014/0304406 A1 | 10/2014 | Baumback et al. |
| 2014/0372511 A1 | 12/2014 | Kapadia et al. |
| 2015/0012649 A1 | 1/2015 | Baumback et al. |
| 2015/0032801 A1 | 1/2015 | Hart |
| 2015/0088968 A1 | 3/2015 | Wei et al. |
| 2015/0156280 A1 | 6/2015 | Vaswani et al. |
| 2015/0220990 A1 | 8/2015 | Kobyakov et al. |
| 2015/0242379 A1 | 8/2015 | Kuivinen et al. |
| 2015/0263927 A1 | 9/2015 | Baumback et al. |
| 2015/0288593 A1 | 10/2015 | Campbell |
| 2015/0326491 A1 | 11/2015 | Baumback et al. |
| 2015/0333997 A1 | 11/2015 | Mermoud et al. |
| 2015/0358250 A1 | 12/2015 | Baumback et al. |
| 2016/0020972 A1 | 1/2016 | Baumback et al. |
| 2016/0057072 A1 | 2/2016 | Baumback et al. |
| 2016/0188181 A1 | 6/2016 | Smith |
| 2016/0267354 A1 | 9/2016 | Bettis et al. |
| 2017/0054621 A1 | 2/2017 | Baumback et al. |
| 2017/0070446 A1 | 3/2017 | Baumback et al. |
| 2017/0187591 A1 | 6/2017 | Baumback et al. |
| 2018/0007121 A1 | 1/2018 | Krishnan et al. |
| 2018/0054371 A1 | 2/2018 | Baumback et al. |

OTHER PUBLICATIONS

Chang, F., et al., Automatic Configuration and Run-time Adaptation of Distributed Applications, 2000, IEEE, 10 pages.

Kounev, S., et al., Autonomic QoS-Aware Resource Management in Grid Computing Using Online Performance Models, 2007, ICST, Valuetools, 2007, 10 pages.

Nilsson et al., IP-Address Lookup Using LC-Tries, IEEE Journalk on Selected Areas of Communication, Jun. 1999, vol. 17, Issue 6, pp. 1083-1092.

Arcelli et al., "A New Technique for Image Magnification", p. 53-61, 2009.

Feldmeier, Improving Gateway Performance With a Routing-Table Cache, Massachusetts Institute of Technology, Laboratory for Computer Science, IEEE, Mar. 27, 1988, pp. 298-307.

Halpern, et al., Internet Draft, "Advertising Equal Cost Multipath routes in BGP; draft-bhatia-ecmp-routes-in-bgp-02.txt", The Internet Society 2006, 16 pages.

Kalogiros et al, "Understanding Incentives for Prefix Aggregation in BGP", Re-Architecting the Internet, ACM, Dec. 1, 2009, pp. 49-54.

Ludwig, "Traffic engineering with BGP", Seminar "Internet Routing", Technical University Berlin, Jul. 2, 2009, pp. 1-10.

Schlansker et al, "Killer Fabrics for Scalable Datacenters", HP Technical Report, HPL-2009-26, 26 Feb. 26, 2009, 16 pages.

Extended Search Report in European Application No. 16001480.9 dated Dec. 5, 2016.

Al-Fares, M. et al., A Scalable, Commodity Data Center Network Architecture, SIGCOMM '08 Proceedings, Aug. 17, 2008, pp. 63-74, 66-68, 70-71, Seattle, WA.

McCulloch et al. "A Logical Calculus of the Ideas Immanent in Nervous Activity", Bulletin of Mathematical Biophysics, vol. 5, 1943, 19 pages.

\* cited by examiner

MONITORING PERFORMANCE AND OPERATION OF DATA EXCHANGES

CROSS-REFERENCE TO RELATED APPLICATIONS

This application is a continuation of U.S. patent application Ser. No. 13/372,708, now U.S. Pat. No. 8,489,737, entitled "MONITORING PERFORMANCE AND OPERATION OF DATA EXCHANGES" and filed on Feb. 14, 2012, which in turn is a continuation of U.S. patent application Ser. No. 12/240,583, entitled "MONITORING PERFORMANCE AND OPERATION OF DATA EXCHANGES" and filed on Sep. 29, 2008, the disclosure of which is incorporated herein by reference.

BACKGROUND

Generally described, computing devices and communication networks can be utilized to exchange information. In a common application, a computing device can request content from another computing device via a communication network. For example, a user at a personal computing device can utilize a browser application to request a web page from a server computing device via the Internet. In such embodiments, the user computing device can be referred to as a client computing device and the server computing device can be referred to as a content provider.

Content providers are generally motivated to provide requested content to client computing devices often with consideration of efficient transmission of the requested content to the client computing device and/or consideration of a cost associated with the transmission of the content. Additionally, the content requested by the client computing devices may have a number of components, which can require further consideration of latencies associated with delivery of the individual components as well as the originally requested content as a whole.

With reference to an illustrative example, a requested Web page, or original content, may be associated with a number of additional resources, such as images or videos, that are to be displayed with the Web page. In one specific embodiment, the additional resources of the Web page are identified by a number of embedded resource identifiers, such as uniform resource locators ("URLs"). In turn, software on the client computing devices, such as a browser application, typically processes embedded resource identifiers to generate requests for the content. Often the resource identifiers associated with the embedded resource reference a computing device associated with the content provider such that the client computing device would transmit the request for the additional resources to the referenced computing devices. Accordingly, in order to satisfy a content request, the content provider(s) (or any service provider on behalf of the content provider(s)) would provide client computing devices data associated with the Web page and/or data associated with the embedded resources.

Traditionally, a number of methodologies exist which measure the performance associated with the exchange of data such as in the environment described above. For example, some methodologies provide for limited measurement of performance metrics associated with network side processing of a content request. Other methodologies allow for limited measurement of performance metrics associated with a content request as measured from a browser application's perspective.

BRIEF DESCRIPTION OF THE DRAWINGS

Many of the attendant advantages and aspects of the present disclosure will become more readily appreciated as the same become better understood by reference to the following detailed description, when taken in conjunction with the accompanying drawings, wherein.

DETAILED DESCRIPTION

Generally described, the present disclosure is directed to monitoring the performance and processing of data exchanges between client computing devices and server computing devices. Specifically, aspects of the disclosure will be described with regard to monitoring a data exchange involving a request by a client computing device for an original resource including one or more embedded resources. Performance data can then be used to assess performance related to the processing of the client request for the original resource and any embedded resources. Additionally, the processed performance data can be used to support modifications to the original resource and/or embedded resources to improve performance for subsequent client requests for the original resource and/or embedded resources.

Traditionally, network servers can collect latency information associated with a server's processing of a client request for a resource. For example, network servers can measure a time associated with processing an incoming client request, identifying/obtaining the requested resource, and initiating the transmission of the resource responsive to the client request. Additionally, client computing devices can collect latency information associated with the client computing device's initiation of a resource request and receipt of the resource responsive to the request. Aspects of the present disclosure, which will be described further below, are directed to identifying and providing additional information to improve the performance assessment related to the processing of a client request for an original resource and any embedded resources. Although various aspects of the disclosure will be described with regard to illustrative examples and embodiments, one skilled in the art will appreciate that the disclosed embodiments and examples should not be construed as limiting.

Figure 1:
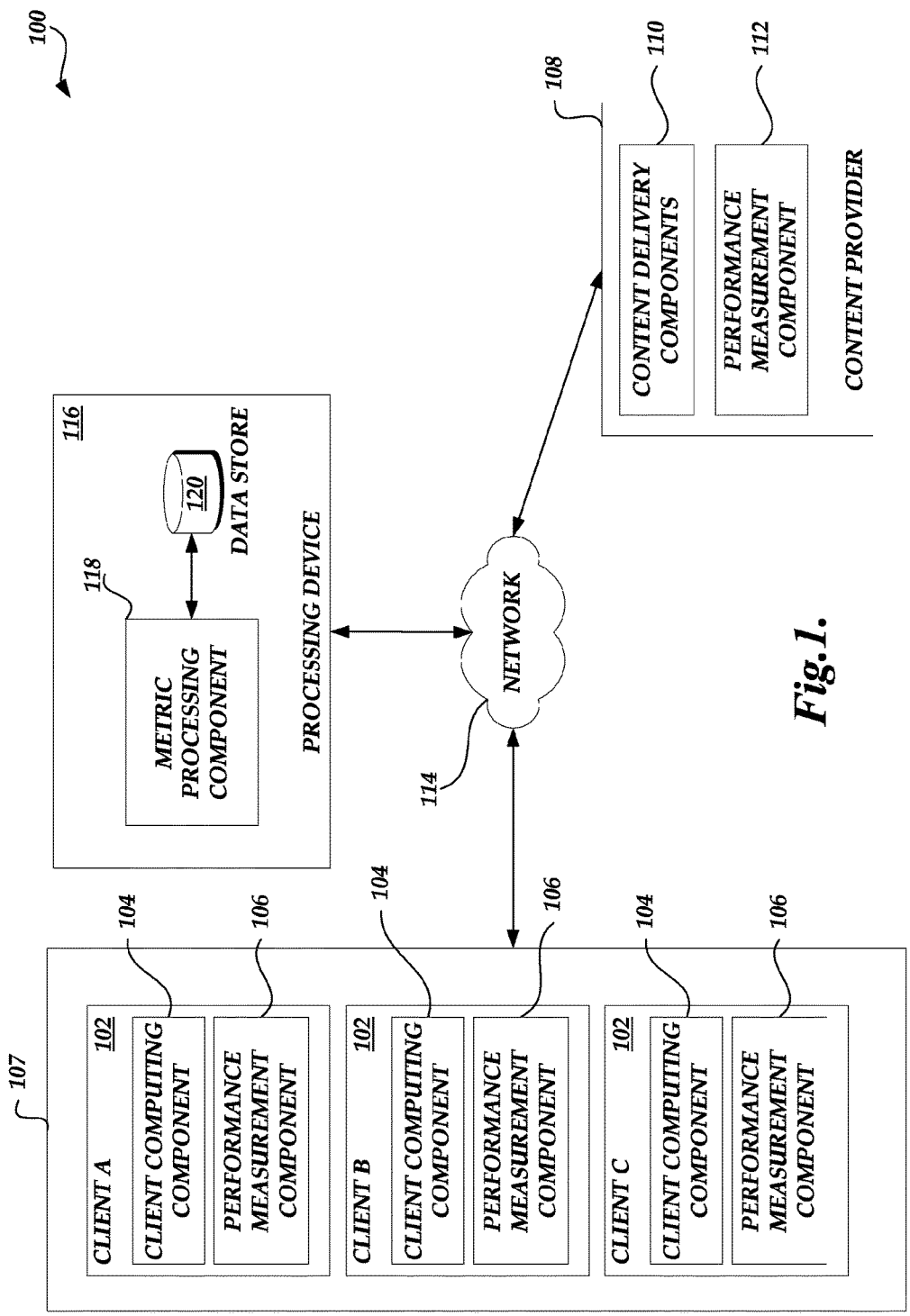
FIG. 1 is a block diagram illustrative of a performance measurement system including a number of client computing devices, a content provider, and a processing device.

FIG. 1 is a block diagram illustrative of a performance measurement system 100 for monitoring the performance and processing of data exchanges. As illustrated in FIG. 1, the performance measurement system 100 includes a number of client computing devices 102 (generally referred to as clients) for requesting content from a content provider. As illustrated in FIG. 1, each client computing device 102 includes a client computing component 104 for requesting content from network resources in the form of an originally requested resource that may include identifiers to one or more embedded resources that need to be requested. As will be described in greater detail below, the client computing component 104 also identifies performance metrics obtained by client computing devices and/or components, such as browser software applications. Additionally, the client computing device 102 includes a performance measurement component 106 that identifies additional performance metrics associated with the client request, such as network level performance data including, for example, timing of receipt of first and last network packets of data for fulfilling the original resource request and each embedded resource request. In one embodiment, the performance measurement component 106 works in conjunction with the client computing component 104 to collect performance metric information such as from an operating system or a data file.

As illustrated in FIG. 1, the client computing component 104 and performance measurement component 106 are executed on each client computing device 102. Alternatively, the client computing component 104 may not be configured, or is otherwise incapable of, obtaining or providing some or all of the performance metric information described herein. In such an embodiment, the client computing component 104 may function with a reduced or limited capacity. In still a further embodiment, the client computing component 104 may function in conjunction with a separate communication software application (e.g., a browser software application) to provide the combined functionality described for the client computing component 104. For example, the client computing component could correspond to a stand alone software application, plugin, script, and the like. Additionally, although each client computing device 102 is illustrated as having a separate performance measurement component 106, in an alternative embodiment, the performance measure component 106 may be shared by one or more client computing devices.

In an illustrative embodiment, the client computing devices 102 can correspond to a wide variety of computing devices including personal computing devices, laptop computing devices, hand-held computing devices, terminal computing devices, mobile devices, wireless devices, various electronic devices and appliances and the like. As also illustrated in FIG. 1, the client computing devices 102 are considered to be logically grouped, as represented generally by client 107, regardless of whether the client computing devices are physically separate and geographically distributed throughout the communication network 114. In this regard, the client computing devices 102 can each communicate directly or indirectly with other computing devices over network 114, such as a wide area network or local network. Additionally, one skilled in the relevant art will appreciate that client 107 can include or otherwise be associated with various additional computing devices/components including, but not limited to, content and resource administrative components, DNS resolvers, scheduling devices/components, and the like.

Each of the client computing devices 102 can accordingly include necessary hardware and software components for establishing communications over the network 114. For example, the client computing devices 102 may include networking components and additional software applications that facilitate communications via the Internet or an intranet. As previously described, the client computing device 102 may include an additional, separate browser software application. The client computing devices 102 can also be associated with, or otherwise include, other computing components, such as proxy applications, for further facilitating communications via the Internet or an intranet. As previously described, the client computing components 104 can each function as a browser software application for requesting content from a network resource. Additionally, in an illustrative embodiment, the performance measurement component 106 of the client computing device 102 can function as a proxy application for managing browser application content requests to the network resource. In other embodiments, the client computing devices 102 may be otherwise associated with an external proxy application, as well as any other additional software applications or software services, used in conjunction with requests for content.

With continued reference to FIG. 1 and as set forth generally above, the performance measurement system 100 can include a content provider 108 in communication with the one or more client computing devices 102 via the communication network 114. The content provider 108 can include a number of content delivery components 110, such as a Web server component and associated storage component corresponding to one or more server computing devices for obtaining and processing requests for content (such as Web pages) from the client computing devices 102. The content provider 108 can further include a performance measurement component 112 for measuring performance metrics, such as a time associated with processing an incoming client request, identifying/obtaining the requested resource, and initiating the transmission of the resource responsive to the client request. One skilled in the relevant art will appreciate that the content provider 108 can include or otherwise be associated with various additional computing resources including, but not limited to, additional computing devices for administration of content and resources, DNS name servers, interfaces for obtaining externally provided content (e.g., advertisements, web services, etc.), and the like. Although the performance measurement system 100 is illustrated in a client-server configuration, one skilled in the relevant art will appreciate that the performance measurement system 100 may be implanted in a peer-to-peer configuration as well.

With yet further continued reference to FIG. 1, the performance measurement system 103 can further include a processing device 116 for collecting and aggregating performance data related to the processing of client requests. The processing device 116 can also be used to assess the collected performance data and to determine if modifications to the original resource and/or embedded resources should be made to improve performance for subsequent client requests for the original resource and/or embedded resources.

As illustrated in FIG. 1, the processing device 116 is in communication with the one or more client computing devices 102 and the content provider 108 via communication network 114. Additionally, as will be further described below, the processing device 116 can include a metric processing component 118 for the collection and aggregation of performance data from the client computing devices 102 and content provider 108, as well as for the assessment of performance data. Specifically, in one embodiment, the client computing components 104 and performance measurement components 106 associated with client computing devices 102 provide performance metric information to the metric processing component 118, while the performance measurement component 112 of the content provider 108 provides performance metric information to the metric processing component 118. The processing device 116 can further include a local data store 120 for storing the received performance data. It will be appreciated by one skilled in the art and others that metric processing component 118 and data store 120 may correspond to multiple devices/components and/or may be distributed.

One skilled in the relevant art will also appreciate that the components and configurations provided in FIG. 1 are illustrative in nature. Accordingly, additional or alternative components and/or configurations, especially regarding additional components, systems and subsystems for facilitating communications may be utilized.

Figure 2:
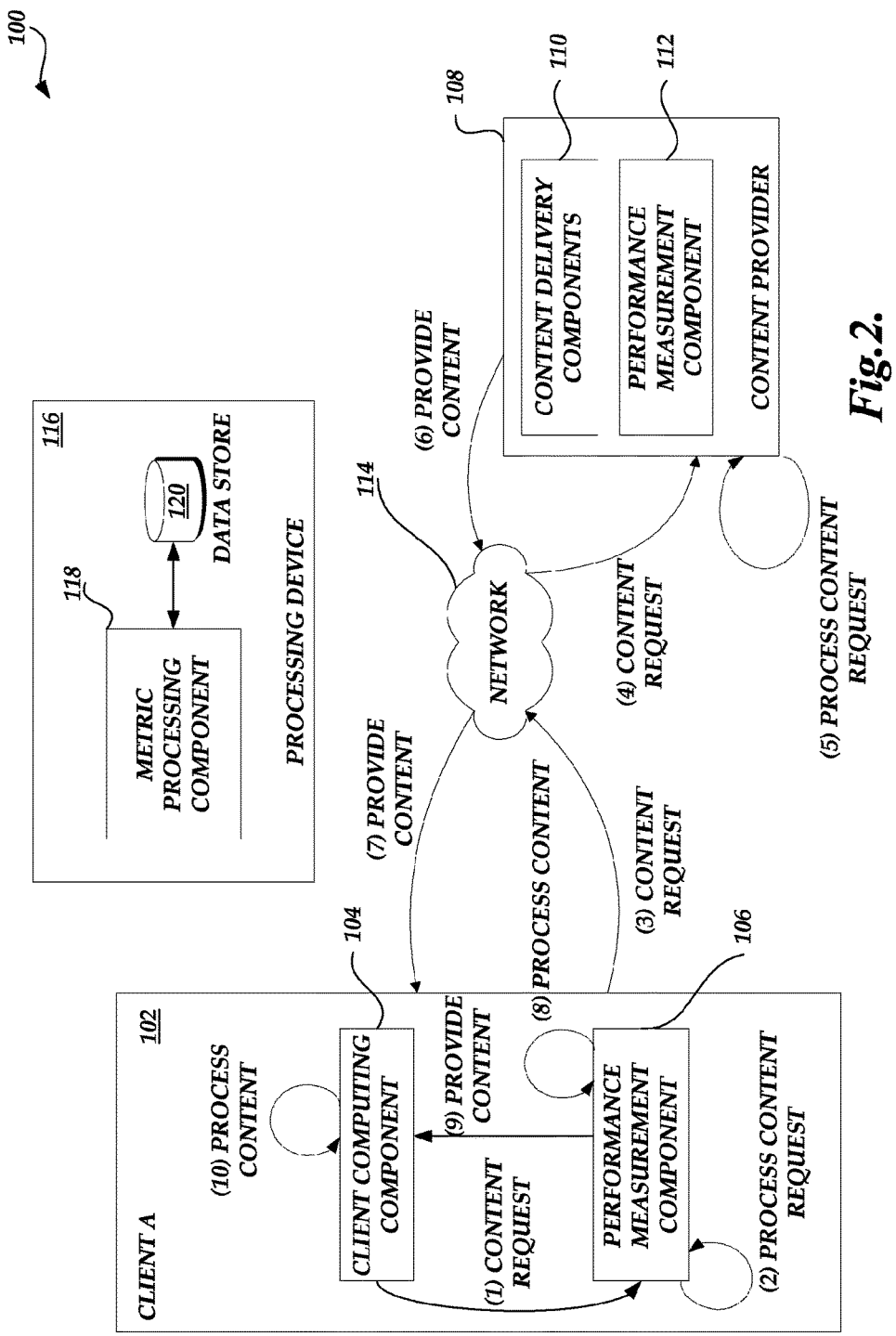
FIG. 2 is a block diagram of the performance measurement system of FIG. 1 illustrating the process of monitoring and fulfilling content requests.
Figure 3:
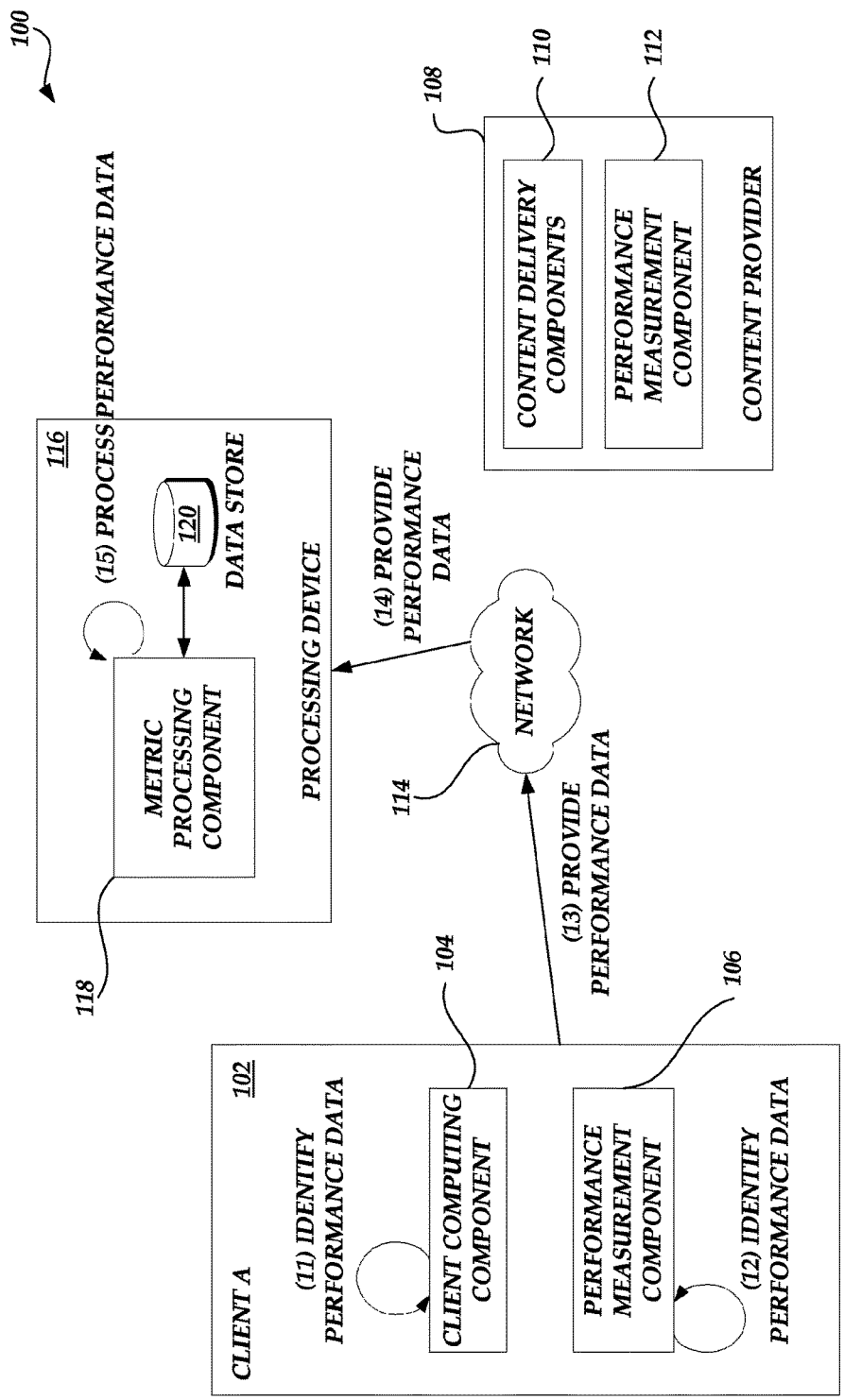
FIG. 3 is a block diagram of the performance measurement system of FIG. 1 illustrating the process of identifying and providing performance metric information from a client computing device.
Figure 4:
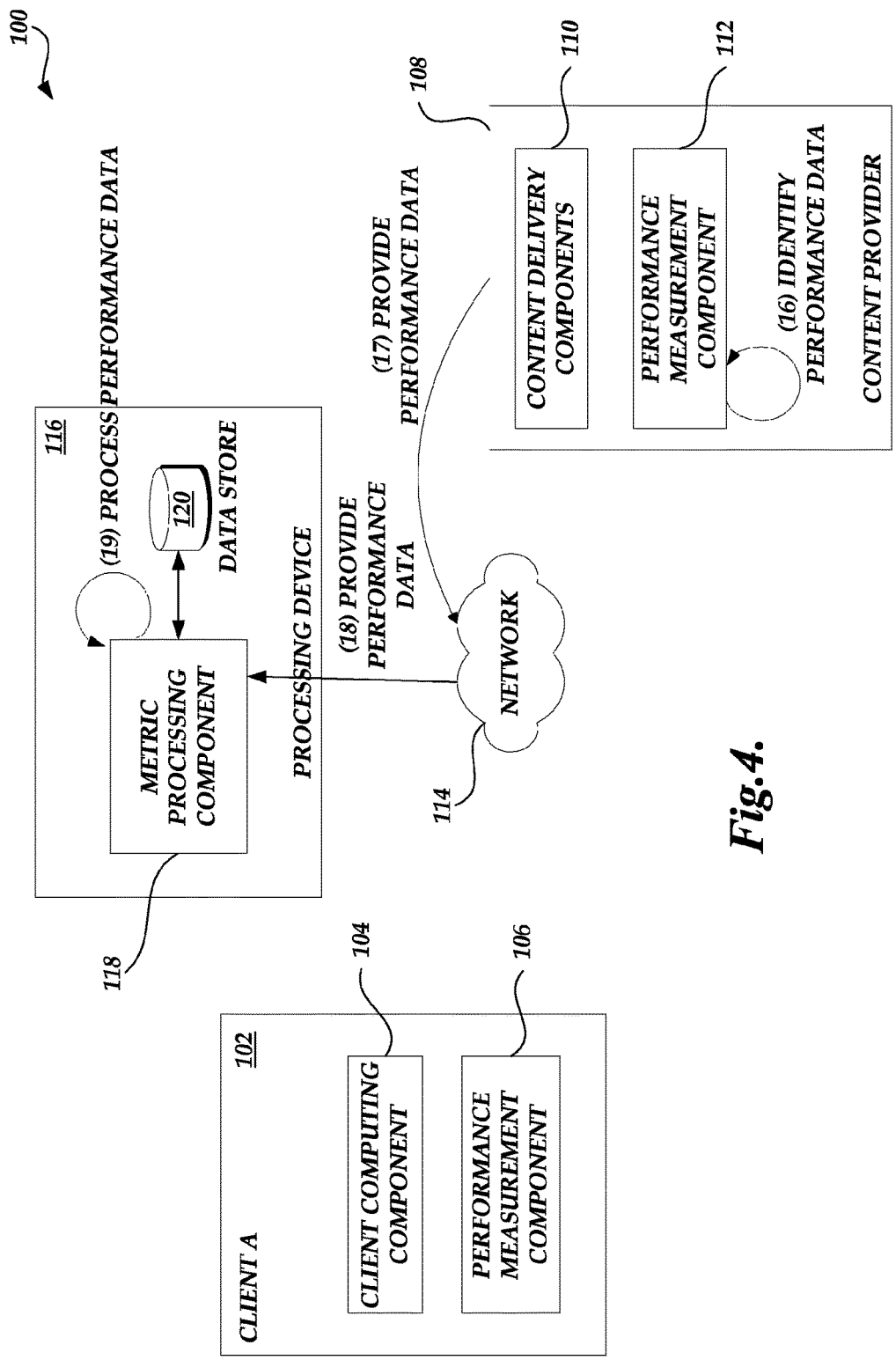
FIG. 4 is a block diagram of the performance measurement system of FIG. 1 illustrating the process of identifying and providing performance metric information from a content provider.

With reference now to FIGS. 2-4, an illustrative example of the operation of the performance measurement system 100 according to some embodiments will be described. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

With reference to FIG. 2, a client computing component 104 initiates a content request that is intended to ultimately be received and processed by the content provider 108. In an illustrative embodiment, the requested content can correspond to a Web page that is displayed on the client computing device 102 via the processing of a base set of information, such as hypertext markup language ("HTML"), extensible markup language ("XML"), and the like. The base set of information can also include a number of embedded resource identifiers that corresponds to resource objects that should be obtained by the client computing device 102 as part of the processing of the requested content. The embedded resource identifiers can be generally referred to as resource identifiers or resource URLs. The request for the base set of information and the subsequent request(s) for any embedded resources can be referred to generally as a "resource request."

In one embodiment, prior to initiating a resource request, the client computing component 104 associates a record identifier with the resource request. As will be described further below, the record identifier can be used to track performance metrics associated with processing the requested resource and any embedded resources. In one example, the record identifier may be attached to the resource request as a header or otherwise embedded in the request. The client computing component 104 then transmits the resource request with the record identifier. However, as will also be described further below, the client computing component 104 can alternatively transmit the associated record identifier in a separate transmission from the resource request.

It will be appreciated by one skilled in the relevant art and others that the client computing component 104 can generate the resource request and associated record identifier itself or receive one or the other or both from another storage or computing device. For example, another computing device, such as processing device 116, can be used to determine whether a test to monitor performance metrics associated with processing a particular resource, such as a Web page, should be conducted. In this example, the processing device 116 can send the test request, which includes a resource identifier corresponding to the desired resource request and a record identifier further associated with the resource identifier, to the client computing device 102.

In one illustrative embodiment, as shown in FIG. 2, the client computing component 104 initiates the content request by transmitting the resource identifier and associated record identifier directly or indirectly to the performance measurement component 106 of the client computing device 102. However, it will be appreciated by one skilled in the relevant art that, in the alternative, the performance measurement component 106 can otherwise intercept the content request initiated by the client computing component 104.

Continuing with the present example and in further reference to FIG. 2, the performance measurement component 106 receives the resource request and forwards the resource request on to the content provider 108 via communication network 114. Thereafter, the performance measurement component 106 continually monitors performance metrics associated with the processing of the requested resource, including any embedded resources. Specifically, in one illustrative embodiment, the performance measurement component 106 monitors network level performance metrics associated with the processing of the requested resource and any embedded resources, such as timing of receipt of the first and last bytes (or packets) of data of each request. The performance measurement component 106 can either obtain such performance metric information directly from the operating system of the client computing device 102 or through the client computing component 104. The performance measurement component 106 associates the monitored performance metrics with the record identifier.

As further illustrated in FIG. 2, the content provider 108 receives the resource request from the client computing device 102 and processes the resource request using content delivery components 110, such as a Web server. The content provider 108 can also use a performance measurement component 112 to monitor performance metrics associated with processing the incoming client request, identifying/obtaining the requested resource, and initiating the transmission of the resource responsive to the client request. As shown in FIG. 2, upon obtaining the requested resource, the content provider 108 initiates transmission of the requested resource to the client computing device 102.

In this illustrative example, the performance measurement component 106 at the client computing device 102 obtains the requested resource, continues monitoring the processing of the requested resource, and forwards the requested resource to the client computing component 104. For example, the performance measurement component 106 may serve as a proxy application for receiving the requested resource or otherwise intercepting the requested resource. The client computing component 104 also tracks performance metrics associated with the processing of the requested resource. Upon receipt of the requested resource, the client computing component 104 begins processing the content for display, execution, or storage on a resource associated with the client computing device 102. This processing may include all or some of, for example, rendering into a framebuffer or other memory, displaying on a local or remote display device, execution on a virtual machine, and so forth. As will be further described below, the above described functions apply to the processing of the originally requested resource, as well as any embedded resources.

With reference now to FIG. 3, the client computing component 104 and the performance measurement component 106 of the client computing device 102 can each identify performance metric information that the respective components have monitored and/or collected. The performance metric information from the client computing component 104 can include a variety of information, such as process information, memory information, network data, resource data, client computing component information, including page setups, browser rendering information, state variables, and other types of information. In one specific example, the performance metric information can include information regarding a time at which a particular resource was rendered on a Web page, its location on the page, whether the resource was rendered on the device display, and the like. The performance metric information from the performance measurement component 106 of the client computing device 102 can also include a variety of information. In one specific example, the performance metric data can include network statistics, latencies, bandwidths, and data arrival times, such as the timing of receipt of first and last packets of information for the requested resource and each embedded resource. In another specific example, the performance metric information can include timing information associated with processing executable resources, such as JavaScript, as well as additional information that can be used to indirectly determine processing times associated with the execution of the resource once the executable code has been obtained.

The performance metric information from the client computing component 104 and/or the performance measurement component 106 of the client computing device 102 can also include basic resource information, such as an identification of the resource type, a link to a header associated with the requested resource, a size of the resource, and the like. Even further, the performance metric information can include underlying computer resource information, such as a resolution of the display of the client computing device 102, a version of the browser application software, an identification of any plugins associated with the browser application software, an identification of any updates to the operating system of the client computing device 102, and the like.

With continued reference to FIG. 3, the client computing component 104 and the performance measurement component 106 of the client computing device 100 provide the identified performance metric information together with the associated record identifier of the requested resource to the metric processing component 118 of the processing device 116 via the communication network 114. The metric processing component 118 then processes the received performance metric information to assess performance related to the processing of the client request for the original resource and any embedded resources. The processed performance metric information can be used to support modifications to the original resource and/or embedded resources to improve performance for subsequent client requests for the original resource. As will be appreciated by one skilled in the art and others, the processing device 116 can store the received and/or processed performance metric information in local data store 120, or any other data store distributed across the network 114. Additionally, as will be further described below in reference to FIG. 7, the processing device 116 can cause the display of the processed performance metric information to a user of the system for further assessment.

In one illustrative embodiment, once the client computing component 104 completes processing of the requested resource and any embedded resources, the client computing component 104 identifies performance metric information that the client computing component 104 monitored and/or otherwise collected related to such processing. In this example, the client computing component 104 provides the identified performance metric information with the record identifier associated with the requested resource to the metric processing component 118. Upon receipt of this information, the metric processing component 118 then requests any further performance metric information related to the requested resource and any embedded resources from the performance measurement component 106 of the client computing device 102. In response, the performance measurement component 106 of the client computing device 102 identifies and provides performance metric information with the record identifier associated with the requested resource to the metric processing component 118. The metric processing component 118 can use the record identifier to aggregate the received performance metric information. It will be appreciated by one skilled in the art and others that the identified performance metric information can be transmitted to the metric processing component 118 by a number of alternative methodologies and/or components.

With reference now to FIG. 4, in one illustrative embodiment, the performance measurement component 112 of the content provider 108 can identify performance metric information that it has collected related to the processing of the requested resource and/or any embedded resource. The performance measurement component 112 provides the identified performance metric information to the metric processing component 118 of the processing device 116 via communication network 114. As will be appreciated by one skilled in the art and others, the performance measurement component 112 of the content provider 108 can provide the performance metric information upon request from the processing device 116 or upon completing its processing of the requested resource. As will be described further below, the processing device 116 can then aggregate the performance metric information from all components for displaying, processing, storing, or otherwise assessing performance related to the processing of the requested resource.

Figure 5:
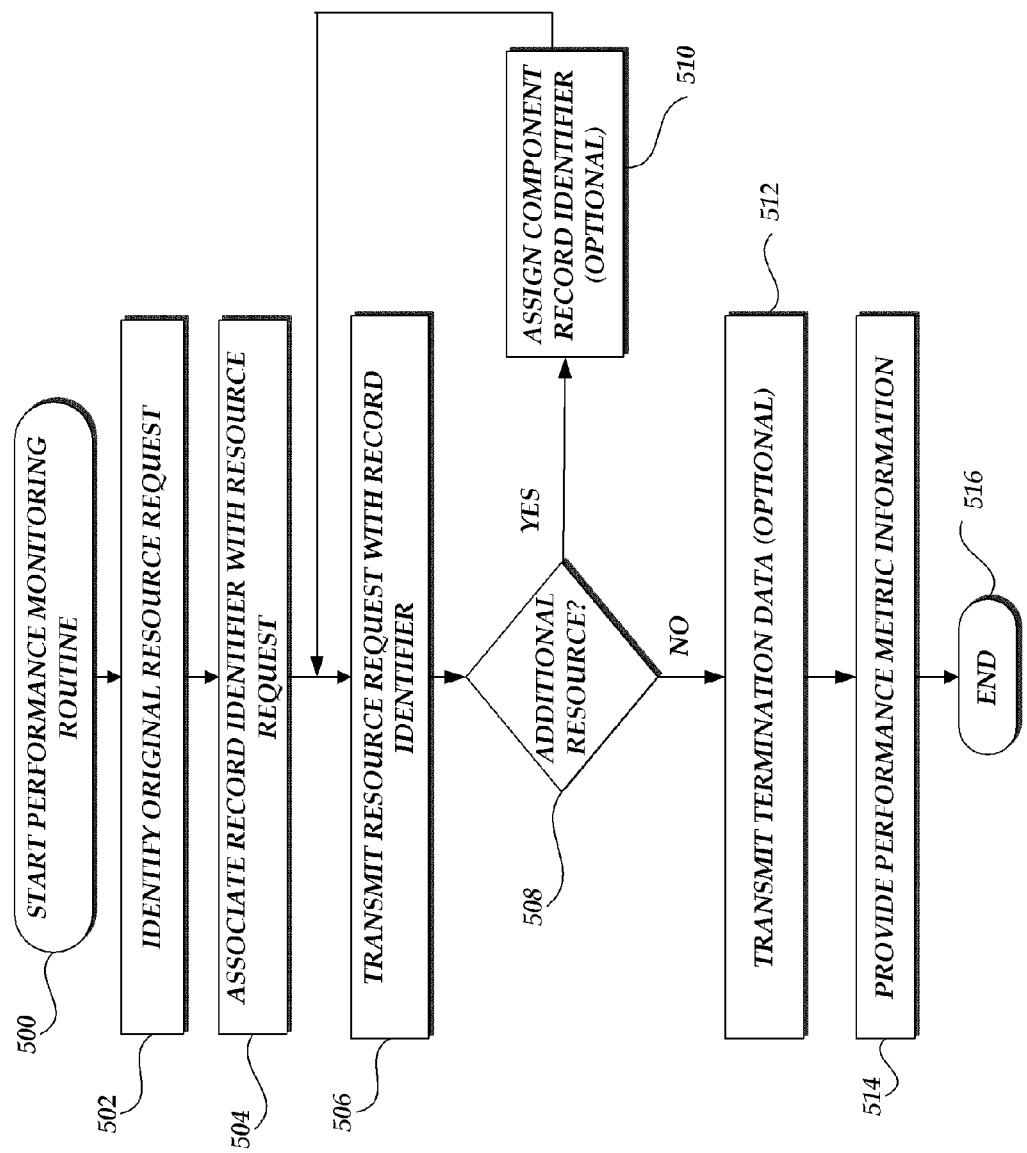
FIG. 5 is a flowchart illustrative of a performance monitoring routine implemented by a client computing device for monitoring the performance associated with resource requests made by the client computing device.

With reference now to FIG. 5, one embodiment of a performance monitoring routine 500 implemented by the client computing component 104 of the client computing device 102 will be described. One skilled in the relevant art will appreciate that actions/steps outlined for routine 500 may be implemented by one or many computing devices/components that are associated with the client computing device 102. Accordingly, routine 500 has been logically associated as being generally performed by the client computing device 102, and thus the following illustrative embodiments should not be construed as limiting.

At block 502, a client computing component 104 identifies an original resource request. As previously mentioned, the client computing component 104 can generate the original resource request or receive the original resource request from another computing device, such as processing device 116. In one example, the original resource request can be for a Web page, such as http://example.com. At block 504, the client computing component 104 associates a record identifier (RID) with the original resource request. The RID may be a unique identifier associated with the original resource request. As will be further described below, the RID can also be associated with any embedded resources included in a response to the original resource request. Even further, although not illustrated, in an alternative embodiment, in the event that the client computing component 104 does not need a RID, the client computing component 104 may not associate a RID with the resource request at shown at block 504.

At block 506, the resource request is transmitted to another entity. In this example, the resource request is transmitted to the performance measurement component 106 of the client computing device 102. As previously mentioned, the performance measurement component 106 can alternatively intercept the transmission request as it is being routed to a content provider 108 for example. In one illustrative embodiment, the resource request may itself contain the RID, such that the resource request and associated RID are transmitted as part of the same transmission. For example, the RID can be included as a portion of the resource URL used to request the resource. Alternatively or additionally, the RID may be transmitted in a second communication, either before or after the transmission including the resource request. For example, a "start new request group" command, including the RID may be issued before or after the initial resource request. In one further alternative embodiment, the client computing component 104 may not include a RID with the issuance of a "start new request group" command, and in this case, the performance measurement component 106 may generate, or otherwise obtain, such a RID upon receipt of the "start new request group" command.

Continuing at block 508, a determination is made at the client computing component 104 regarding whether any additional resources need to be requested to fulfill the original resource request. As appreciated by one skilled in the relevant art, a response to the original resource request can be returned to the client computing component 104 which includes a number of resource URLs corresponding to a number of embedded resources required to fulfill the original resource request. In one embodiment, if such additional resources are identified, processing returns to block 506 where the client computing component 104 transmits one or more requests for the identified embedded resources with the RID associated with the original resource request.

Alternatively or additionally, the client computing component 104 can assign a component record identifier (CRID) to each request for an embedded resource at optional block 510. In this example, when processing returns to block 506, the client computing component 104 can transmit the one or more embedded resource requests with the respectively assigned CRIDs. In an illustrative embodiment, the requests for embedded resources can be transmitted with respective CRIDs alone or together with the RID of the original resource request. As embedded resource requests (or component requests) are fulfilled, the returned content is processed by the client computing component 101. It will be appreciated by those skilled in the art and others that a response to an embedded resource request can include links to further embedded resources. As such, the functionality associated with blocks 506-510 may be repeated as described above until no resource requests are outstanding and no more additional resources need to be requested.

It will be appreciated by one skilled in the relevant art that resource requests are processed by the client computing device 100 in accordance with logic associated with the particular configuration of the browser software application. For example, the browser software application may be limited by a number of resource requests that can be made at one time, an order associated with the type of requests that can be made, an order based on a predetermined location for the requested resources on a display screen, or other limitations provided in the requested base resource.

Once the client computing component 104 determines at block 508 that no additional resources need to be obtained to fulfill the original resource request or any subsequent embedded resource request, processing can continue at optional block 512. At block 512, a termination command, such as "end new request group", may be transmitted to indicate that the request, including requests for all embedded resources, has completed. Such a termination command may provide closure to a "start new request group" command, if one were issued as part of the first iteration of block 506. In this example, the start/termination commands can be received and used by the performance measurement component 106 to determine which requested resources are associated with a particular originally requested resource.

At block 514, once the client computing component 104 has completed processing the requested original resource and any embedded resources, the client computing component 104 provides monitored performance metric information to processing device 116. The client computing component 104 monitors such performance metric information throughout the processing of the original resource request from initiation of the original resource request to final rendering of the requested resource and any embedded resources. The performance metric information can include, for example, timing data associated with the initiation of each request, receipt of a response to each request, and rendering of each requested resource, as well as other information as described herein. The routine 500 ends at block 516.

Figure 6:
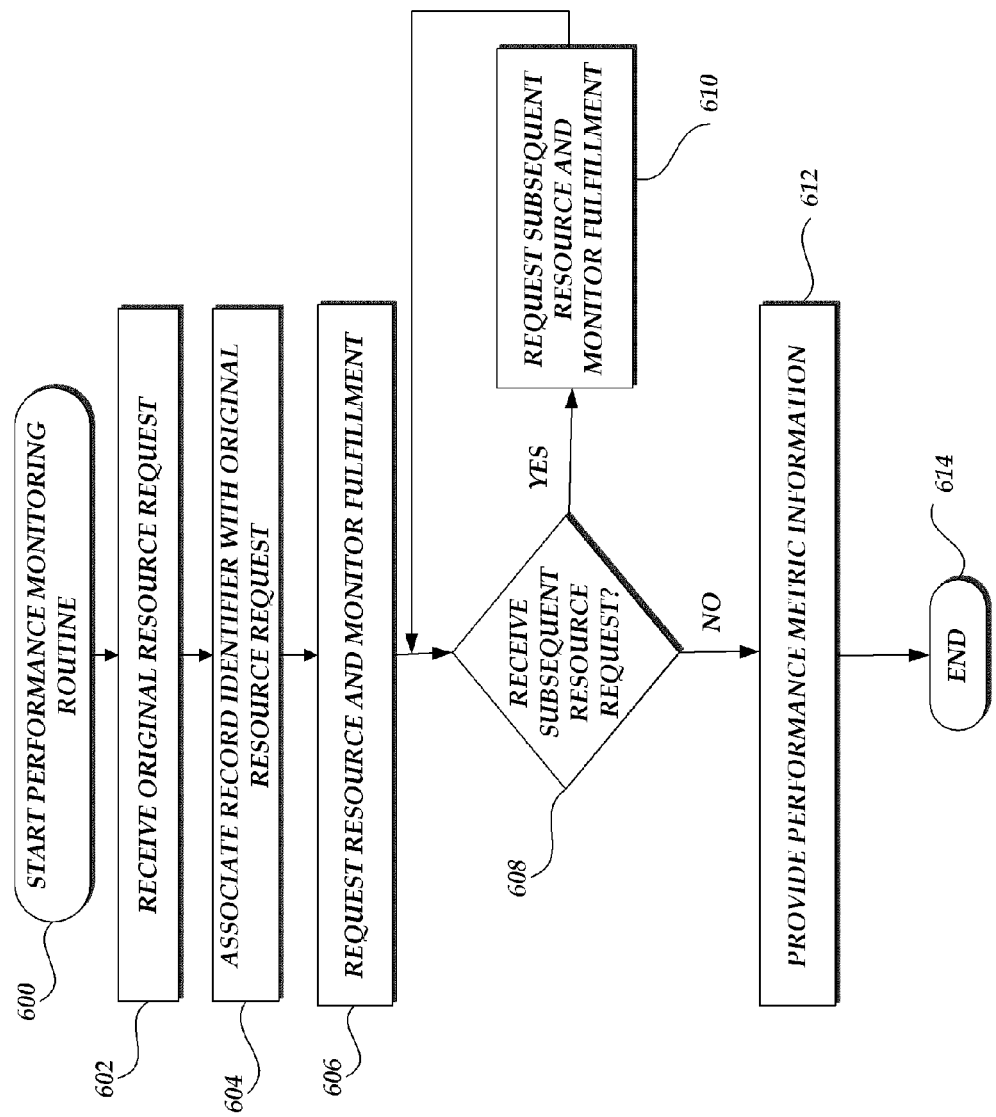
FIG. 6 is a flowchart illustrative of a performance monitoring routine implemented by a performance measurement component for further monitoring client side performance associated with resource requests made by the client computing device.

With reference now to FIG. 6, one embodiment of a performance monitoring routine 600 implemented by the performance measurement component 106 of the client computing device 102 will be described. One skilled in the relevant art will appreciate that actions/steps outlined for routine 600 may be implemented by one or many computing devices/components that are associated with the client computing device 102. Accordingly, routine 600 has been logically associated as being generally performed by the client computing device 102, and thus the following illustrative embodiments should not be construed as limiting.

At block 602, the performance measurement component 106 of the client computing component 102 receives (or intercepts) an original resource request from the client computing component 104. In one illustrative embodiment, the performance measurement component 106 receives the RID with the original resource request. Alternatively, the RID can be provided as a part of a separate transmission, and accordingly, in this case, the performance measurement component 106 receives the RID separately. At block 604, the performance measurement component 106 associates the RID with the original resource request. In accordance with other embodiments discussed above, the original resource request may be preceded or followed by a command or instructions, such as a "start new request group" command. Such commands may be transmitted with or without a RID, as set forth above. If such commands are received at the performance measurement component 106 without a RID, the performance measurement component can generate, or otherwise obtain, a RID to associate the original resource request at block 604.

Continuing at block 606, the original resource may be requested, such as by proxying or forwarding the resource request to the content provider 108 via network 114. The resource request may be modified from its original form before sending, such as by stripping headers including the associated RID. The performance measurement component 106 also monitors the processing, including fulfillment, of the resource request at block 606. For example, the performance measurement component can identify performance metric information related to the initiation of the resource request, the receipt of first and last bytes of data for each requested resource and any embedded resources, the receipt of responsive content, and the like. As will be appreciated by one skilled in the relevant art, once a response to the resource request is received at the performance measurement component 106, the response is returned to the requesting application.

At block 608, a determination is made by the performance measurement component 106 regarding whether a subsequent resource request related to the original resource request has been made by the client computing component 104 and accordingly received (or intercepted) by the performance measurement component. If a subsequent embedded resource request (which may bear the same RID as the original resource request, an appropriate CRID, and/or be within a start/stop command window) is received, processing continues at block 610. At block 610, the performance measurement component 106 requests any embedded resources and monitors the processing of the requested embedded resources as similarly described above in reference to the originally requested resource and block 606. The functionality associated with blocks 608-610 may be repeated as described above until no resource requests are outstanding.

If the performance measurement component 106 determines that no more outstanding resource requests remain at block 608, processing continues at block 612. Specifically, the performance measurement component 106 provides monitored performance metric information to processing device 116. The performance measurement component 102 monitors such performance metric information throughout the processing of the original resource request, from initiation of the original resource request to final rendering of the requested resource and any embedded resources. The performance metric information can include, for example, timing data associated with the initiation of each request, receipt of a response to each request, and receipt of first and last packets of data for each of the original resource request and any embedded resource requests, as well as other additional information as described herein.

In one illustrative embodiment, the performance measurement component 106 can identify performance metric information for providing to the processing device 116 in a variety of ways. For example, in one embodiment, the performance measurement component 106 can store performance measurement information in a log file together with identifiers to associate performance metric information with corresponding resource requests. In this example a set of requested resources may be joined by common RIDs, common CRIDs, associated CRID (e.g., where each component has a distinct CRID, but the distinct CRIDs of a single group have been associated or otherwise linked together, such as by a RID). In another illustrative embodiment, the performance measurement component can retrieve performance metric information from a log file based on timing information associated with a resource request. For example, a set of requested resources may be defined as the resources requested or fulfilled between a start command and an end command, or between an original resource request (inclusive) and a stop command. The routine 600 ends at block 614.

Figure 7:
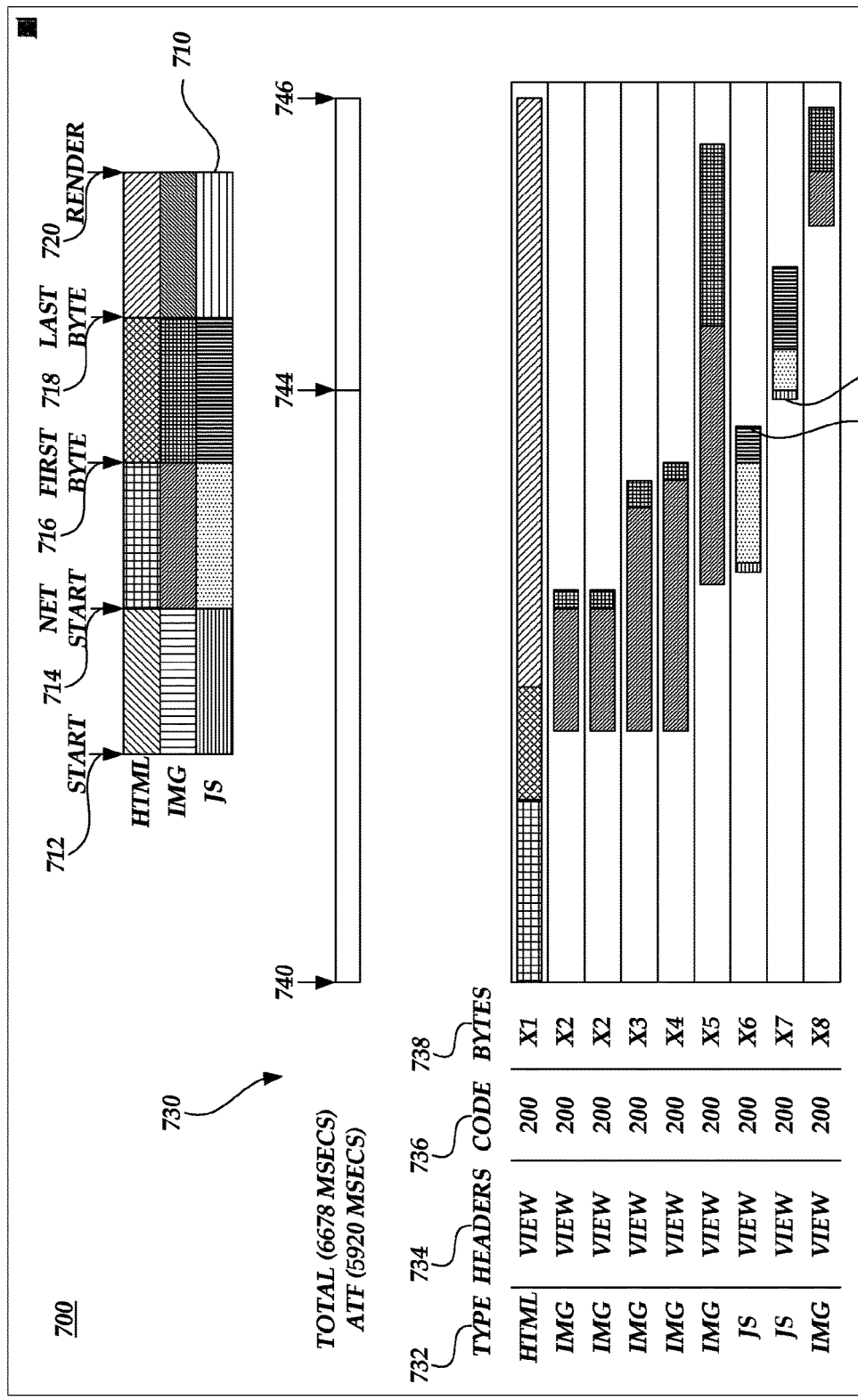
FIG. 7 is an illustrative user interface displaying a variety of performance metric information collected by the performance measurement system of FIG. 1.

With reference now to FIG. 7, an illustrative user interface 700 generated by the processing device 116 for displaying a variety of performance metric information collected, or otherwise identified, by the performance measurement system of FIG. 1 will be described. Generally, the user interface 700 shown in FIG. 7 provides a graphical side-by-side comparison of the performance metric information identified for the originally requested resource and some or all requested embedded resources. The user interface 700 may also be provided over the network 114 for display on other computing devices.

With reference to FIG. 7, the user interface 700 may be utilized to display a set of time-based events for a set of resources. For example, the user interface 700 may graphically represent an order of time-based events for an originally requested resource and for each subsequent request for embedded resources. More specifically, the user interface 700 includes a legend 710 identifying, for a number of resource types, a graphical indicator corresponding to a number of time-based events 712, 714, 716, 718, and 720 involved in processing a request for the resource. The resource types identified in the legend 710 include HTML resources, image (IMG) resources, and JavaScript (JS) resources. However, it will be appreciated that a number of alternative or additional resource types can be identified. For each resource type, the legend 710 provides a distinct indicator corresponding to a transition period and/or transition event(s) occurring between each identified event 712, 714, 716, 718, and 720. In one embodiment, the distinct indicators may be visual in nature, such as color-coded, cross-hatched, or the like. In another embodiment, instead of using a distinct indicator for each transition period and/or transition event(s) associated with each resource type as illustrated in FIG. 7, a distinct indicator may be used simply for each transition period and/or transition event(s) regardless of the resource type.

In an illustrative embodiment, events 712, 714, 716, 718, and 720 correspond to the following time-based events identified by the performance metric information. Event 712 identifies a Start Event representing a time at which the corresponding resource was known to be required by the client computing component 104. Event 714 identifies a NetStart Event representing a time at which the corresponding resource was actually requested by the client computing component 104. The timing of the NetStart Event may not be the same as the Start Event if, for example, the browser software application limits the number of concurrent connections with a particular domain. Event 716 identifies a First Byte Event representing a time at which the first byte (or first packet) of the requested resource is received by the performance measurement component 106 of the client computing device 102. Event 718 identifies a Last Byte Event representing a time at which the last byte (or last packet) of the requested resource is received by the performance measurement component 106 of the client computing device 102. Finally, event 720 identifies a Render Event representing a time at which the client computing component 104 finishes rendering the requested resource.

A second portion 730 of the user interface 700 corresponds to a representation illustrating the occurrence of each of the time-based events 712, 714, 716, 718, and 720 for all or some of the resources requested in resolving the original resource request. In one embodiment, the representation horizontally corresponds to time and vertically corresponds to an ordered listing of the requested resources. In one example, the order can specifically correspond to an order in which the requested resources are initially identified by the client computing component 104. In addition, the second portion 730 of the display includes a variety of additional information adjacent to the time-based event representation for each resource. For example, in a first column 732, a resource type for each resource may be provided, e.g., HTML, image, CSS, JavaScript, and the like. In a second column 734, a link to a header corresponding to each requested resource may be provided. In a third column 736, an HTTP response status code corresponding to each requested resource can be provided. Code 200, for example, is indicative of a standard response for successful HTTP requests. Finally, in a fourth column 738, the size of each resource can be provided.

In another embodiment, yet further additional information may be displayed in the user interface 700. For example, the user interface 700 may display the total processing time, both numerically and graphically, associated with processing the original resource request including any embedded resource requests. In this example, an indicator 740 may illustrate a starting time while an indicator 746 may illustrate an ending time, both associated with the processing of the original resource request as a whole. Additionally, when the original resource request is a request for a Web page, the user interface 700 may illustrate a time, both numerically and graphically, at which all resources have been rendered in a portion of a Web page which is initially visible to a user without scrolling. This portion of the Web page is often referred as an "above the fold," "above the scroll," or "above the crease" portion. An indicator 744 in the user interface 700 of FIG. 7 illustrates an "above the fold" (ATF) event.

The foregoing performance metric information provided in the user interface 700 may be identified and/or collected by a combination of the client computing component 104 and/or the performance measurement component 106 of the client computing device 102. However, it will be appreciated by those skilled in the art and others that additional performance metric information can be displayed. Such additionally displayed performance metric information can be obtained by the client computing device 102, by the performance measurement component 112 of the content provider 108, or based on further processing of any of the identified and/or collected performance metric information. It will also be appreciated by one skilled in the relevant art that each resource and/or each type of resource may be associated with all or only a portion of the above-described events and/or performance metric information. In addition, other events and/or indicators associated with the other events may be used and illustrated in the user interface 700.

In one specific example, an executable resource, such as a JavaScript resource, is not rendered and, accordingly, neither a Render Event 720 nor an associated indicator illustrating the transition between a Last Byte Event 718 and a Render Event 720 will be illustrated in the user interface 700 for that executable resource. However, the processing device 116 can indirectly determine and display a processing time associated with execution of the code once the code itself is obtained (i.e., receipt of the last byte of the code which corresponds to the Last Byte Event 718). Such processing time is inferred in the user interface 700 of FIG. 7 by illustration of a gap formed between the receipt of the last byte of code associated with a first JavaScript resource at 750 and the start event associated with a subsequently requested JavaScript resource at 752. Alternatively, an additional event and/or associated indicator could be used to specifically identify the processing time associated with execution of the code.

By providing and displaying the foregoing performance metric information as set forth above, a user of the processing device 116 can readily evaluate the performance associated with processing the originally requested resource, including any embedded resources. In particular, the user interface 700 can help a user identify any problems associated with the processing of the originally requested resource, as well as determine one or more solutions to the identified problem. Solutions for improving performance may include, for example, making changes to the content itself, to the organization of content within the originally requested resource, to the client computing component, and the like.

It will be appreciated by those skilled in the art and others that while processing and monitoring functions have been described herein as being performed at various components of the client computing device, these functions can be distributed across one or more computing devices. In addition, the performance metric information monitored at the client computing device can be maintained globally by the client computing device and shared with all or some subset of the components of the client computing device.

It will further be appreciated by those skilled in the art and others that all of the functions described in this disclosure may be embodied in software executed by one or more processors of the disclosed components. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
as implemented by a client computing device configured with specific executable instructions,
receiving, by the client computing device from a different processing device, an instruction for the client computing device to request an original resource;
generating, by the client computing device, an original resource request for the original resource;

associating, by the client computing device, a record identifier with an original resource request from the client computing device, wherein the original resource request includes an original resource identifier corresponding to an original resource;

determining, by the client computing device, performance data associated with processing individual embedded resource requests corresponding to embedded resources included in a response to the original resource request, wherein the performance data includes, for individual embedded resource requests, timing of receipt of a first byte of data at the client computing device for the respective individual embedded resource; and transmitting by the client computing device, to the different processing device, the determined performance data with the record identifier.

2. The computer-implemented method of claim 1, wherein the performance data further includes, for individual embedded resource requests, information corresponding to timing of receipt of a last byte of data for the respective individual embedded resource.

3. The computer-implemented method of claim 2, wherein the performance data further includes, for individual embedded resource requests, information corresponding to a render event representing a time the client computing device completes rendering the respective individual embedded resource.

4. The computer-implemented method of claim 3, wherein the timing of receipt of a last byte of data and the render event corresponding to respective individual embedded resource requests are different.

5. The computer-implemented method of claim 1, wherein the performance data further includes, for individual embedded resource requests, information corresponding to a start time event representing a time the client computing device is aware of the need to initiate the respective individual embedded resource request.

6. The computer-implemented method of claim 5, wherein the performance data further includes, for individual embedded resource requests, information corresponding to a netstart time event representing a time the client computing device requested the respective individual embedded resource.

7. The computer-implemented method of claim 6, wherein the start time event and the netstart time event corresponding to respective individual embedded resource requests are different.

8. A computer-implemented method comprising:
as implemented by a client computing device configured with specific executable instructions,
receiving, by the client computing device from a different processing device, an instruction for the client computing device to request an original resource;
generating, by the client computing device, an original resource request for the original resource;
associating, by the client computing device, a record identifier with the original resource request from the client computing device, wherein the original resource request includes an original resource identifier corresponding to the original resource;
determining, by the client computing device, performance data associated with processing individual embedded resource requests corresponding to embedded resources included in a response to the original resource request, wherein the performance data includes, for individual embedded resource requests, a start time event representing a time the client computing device is aware of the need to initiate the respective individual embedded resource request; and
transmitting by the client computing device, to the different processing device, the determined performance data with the record identifier.

9. The computer-implemented method of claim 8, wherein the performance data includes, for individual embedded resource requests, information corresponding to a netstart time event representing a time the client computing device requested the respective individual embedded resource.

10. The computer-implemented method of claim 9, wherein the performance data further includes, for individual embedded resource requests, information corresponding to a render event representing a time the client computing device completes rendering the respective individual embedded resource.

11. The computer-implemented method of claim 8, wherein associating a record identifier with the original resource request comprises generating a record identifier for the original resource request.

12. A system comprising:
one or more client computing devices including at least one hardware component, the one or more client computing devices operative to:
receive, from a different processing device, an instruction for the client computing device to request an original resource;
generate an original resource request for the original resource;
associate a record identifier with an original resource request from the one or more client computing devices, wherein the original resource request includes an original resource identifier corresponding to an original resource;
determine performance data associated with processing individual embedded resource requests corresponding to embedded resources included in a response to the original resource request, wherein the performance data includes, for individual embedded resource requests, timing of receipt of a first byte of data at the client computing device for the respective individual embedded resource; and
transmit, to the different processing device, the determined performance data with the record identifier.

13. The system of claim 12, wherein the performance data further includes, for individual embedded resource requests, information corresponding to timing of receipt of a last byte of data for the respective individual embedded resource.

14. The system of claim 13, wherein the performance data further includes, for individual embedded resource requests, information corresponding to a render event representing a time the client computing device completes rendering the respective individual embedded resource.

15. The system of claim 13, wherein the timing of receipt of a last byte of data and the render event corresponding to respective individual embedded resource requests are different.

16. The system of claim 12, wherein the performance data further includes, for individual embedded resource requests, information corresponding to a start time event representing a time the client computing device is aware of the need to initiate the respective individual embedded resource request.

17. The system of claim 16, wherein the performance data further includes, for individual embedded resource requests, information corresponding to a netstart time event representing a time the client computing device requested the respective individual embedded resource.

18. The system of claim 17, wherein the start time event and the netstart time event corresponding to respective individual embedded resource requests are different.

19. The system of claim 12, wherein the one or more client computing devices include memory for storing the performance data.

* * * * *